R. KLEIN & T. BRUECK.
PHOTOGRAPHIC SHUTTER.
APPLICATION FILED DEC. 29, 1915.
1,215,284.
Patented Feb. 6, 1917.
3 SHEETS—SHEET 1.
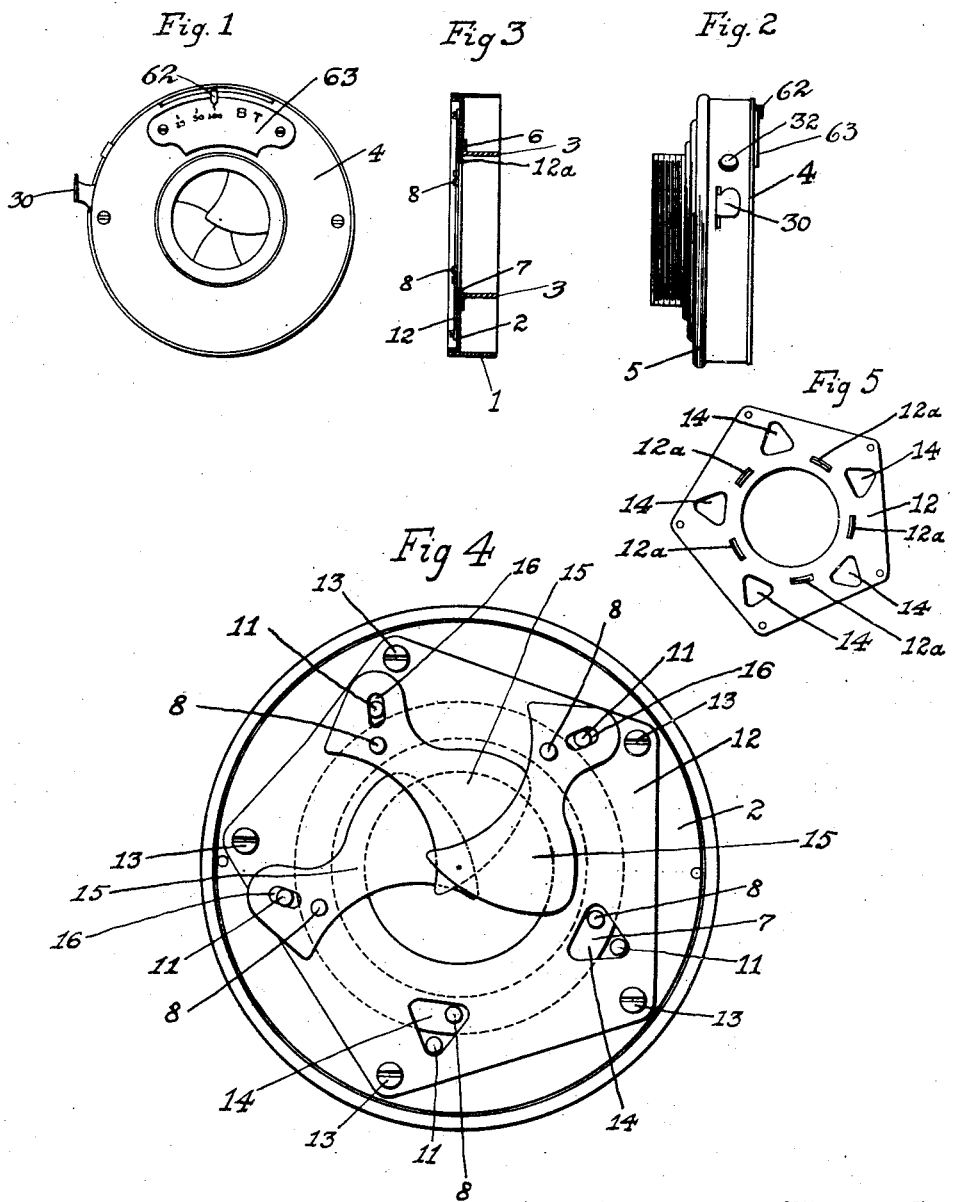

R. KLEIN & T. BRUECK.
PHOTOGRAPHIC SHUTTER.
APPLICATION FILED DEC. 29, 1915.
1,215,284.
Patented Feb. 6, 1917.
3 SHEETS—SHEET 3.
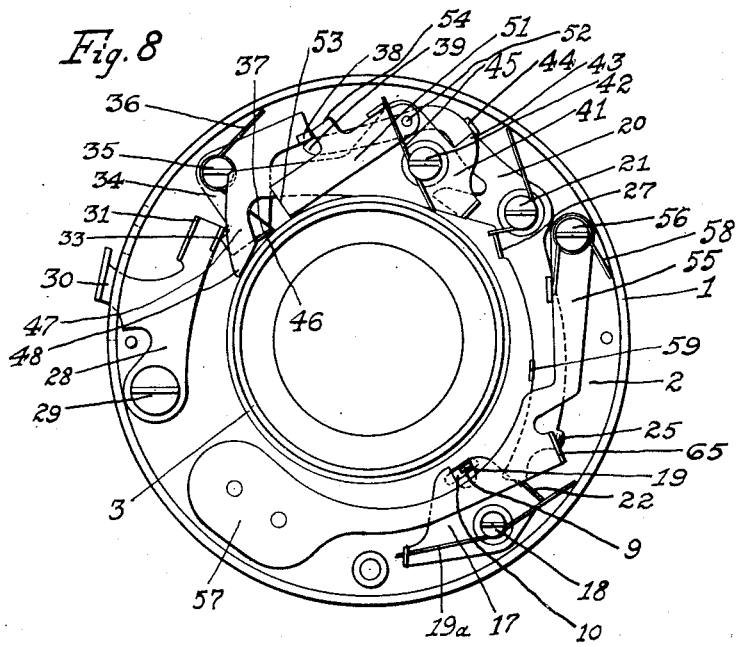
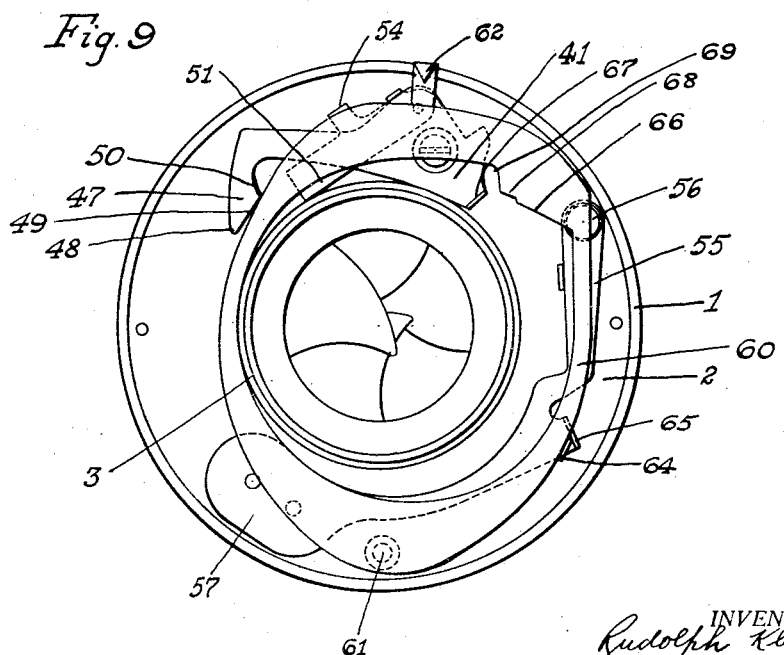
INVENTORS
Rudolph Klein
BY Theodor Brueck
H. H. Simms
ATTORNEYS.

UNITED STATES PATENT OFFICE.

RUDOLPH KLEIN AND THEODOR BRUECK, OF ROCHESTER, NEW YORK.

PHOTOGRAPHIC SHUTTER.

1,215,284.  Specification of Letters Patent.  Patented Feb. 6, 1917.

Application filed December 29, 1915. Serial No. 69,258.

*To all whom it may concern:*

Be it known that we, RUDOLPH KLEIN and THEODOR BRUECK, of Rochester, in the county of Monroe and State of New York, have invented a new and useful Photographic Shutter, which invention is fully set forth in the following specification and shown in the accompanying drawings.

The present invention relates to photographic shutters and an object thereof is to provide an improved construction by which the blade operating ring may be fitted in the shutter with greater ease and less expense while, at the same time, providing a more durable structure. Another object of the invention is to provide a simple and inexpensive retarding means which may be compactly housed in an annular chamber about the shutter opening. Still another object of the invention is to provide an improved controlling member adapted to be arranged in the annular chamber about the shutter aperture to control the detaining means and the retarding means while, at the same time, having ease of action and being simple and being easily assembled.

In the drawings:

Figure 1 is a front view of the shutter embodying the present improvements;

Fig. 2 is a side view of the shutter;

Fig. 3 is a sectional view through the casing of the shutter showing the manner of securing the exposure ring therein, all other movable parts being removed;

Fig. 4 shows one of the casing closures removed to illustrate the exposure blades;

Fig. 5 is a detail view of the plate which secures the exposure ring;

Fig. 8 is a view similar to Fig. 7 showing the parts in the position which they occupy when the shutter is open for time exposure; and Fig. 9 is a view showing the coöperation between the controlling member and the detaining means and the retarding means.

Figure 6:
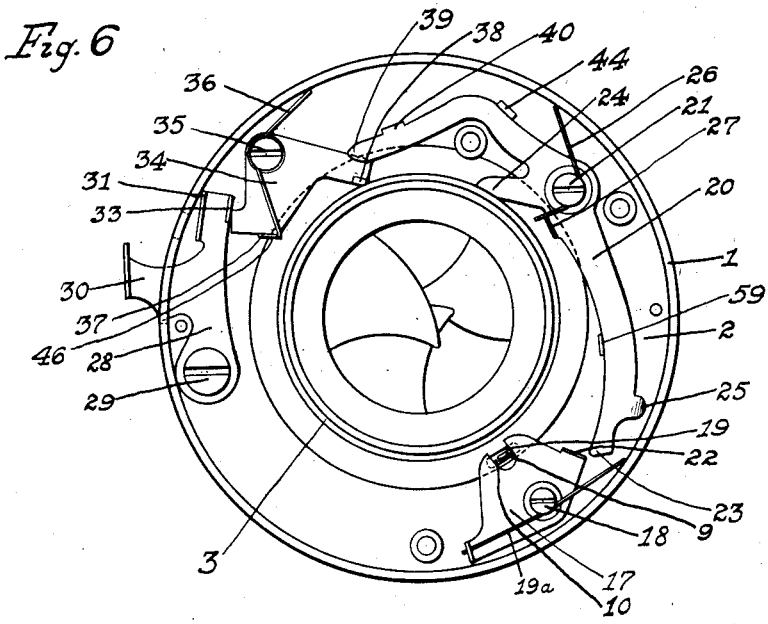
Fig. 6 is an interior view of the casing showing the coöperation between the master member and its operating devices, and between the master member and the exposure mechanism.
Figure 7:
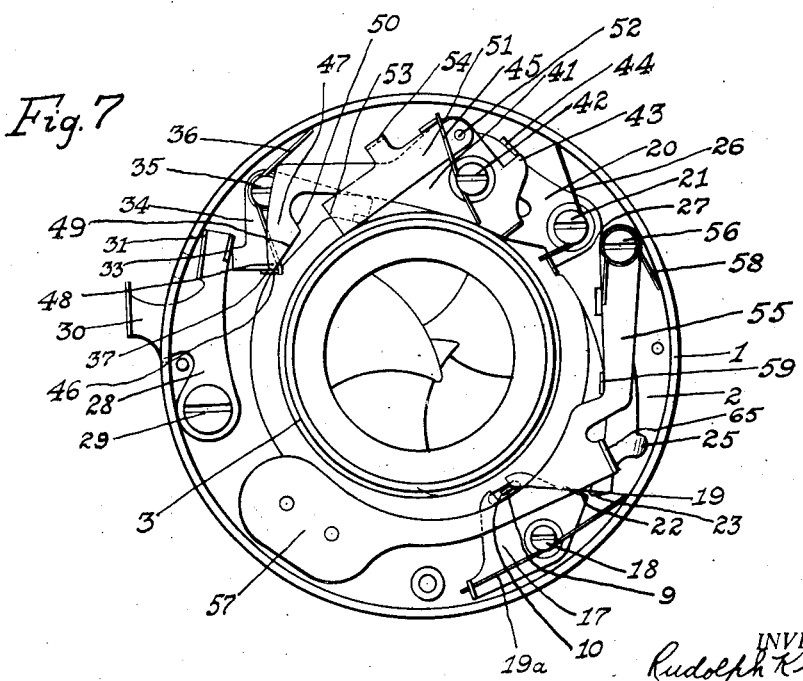
Fig. 7 is a view similar to Fig. 6 showing the detaining means and the retarding lever coöperating with the master member, the shutter being in closed position.

Referring more particularly to the drawings, 1 indicates a ring portion of the casing having a partition 2 preferably formed in one piece therewith and provided with a central aperture or opening. This partition divides the casing into two chambers and has an annular flange 3 projecting from one side thereof to form the lens tube. The annular chamber around the lens barrel is closed by a cover plate 4 while the other chamber is closed by a cover plate 5 which carries the usual iris diaphragm (not shown).

On that side of the partition 2, opposite that from which the annular lens tube 3 projects, an annular depressed portion 6 is formed to receive an exposure ring 7 so that the latter will lie flush with one face of the partition 2. This ring has a plurality of blade pivots 8 extending from one face thereof and an operating projection 9 extending from the other face thereof through a slot 10 in the partition 2. The partition 2 also has a plurality of pivot pins 11 projecting therefrom about the depressed portion. To the end of holding the exposure ring 7 in the depression 6 and, at the same time, providing a flat surface on which the blades may operate, there is employed a plate 12 secured to the partition 2 by screws 13 and provided with triangular slots or openings 14 through which the pivots 8 and 11 project. This plate is also formed with bearing projections 12ª struck up from the plate and engaging the interior circumference of the ring 7, to provide a bearing for the ring. Coöperating with the pivots 8 and 11 are blades 15 each of which is provided with a slot 16 operating on the projection 11 so that is has a shiftable fulcrum on said projection while being pivotally connected to the exposure ring 8. Also forming part of the exposure mechanism is an exposure lever 17, pivoted at 18, and having a slotted portion 19 receiving the projection 9 which extends through the slot 10. A spring 19 acts on the exposure lever 17 to hold the exposure ring in such a position that the blades will normally be closed.

The operating mechanism for the exposure mechanism comprises a motor or master member 20 preferably curved and pivoted at 21 at a point substantially midway between its ends with one arm thereof adapted to coöperate with a beveled projection 22 on the exposure lever 17, said arm being laterally flexible so that, when the master member moves in one direction, its ends 23 will ride over the projection 22 without moving the exposure lever but, when the master member moves in the other direction, the end 23 will engage the projection 22 and move the exposure member in a direction to cause the latter to open the blades after which the master member will slip off the exposure-member projection 22, thus freeing the exposure member and permitting the latter to close the blades under the action of the spring 19. A stop 24 is provided on the master member to coöperate with the annular flange or lens tube 3 in order to limit the movement of the master member, and an inwardly-turned projection 25 coöperates with the partition 2 to prevent the end 23 of the master lever being moved too far inwardly to destroy its coöperation with the exposure lever. A spring 26 surrounds the pivot 21 and acts on the master lever, at 27, to move the latter to normal position after the master lever has been shifted by the operating devices.

The operating devices may be of any suitable form, but preferably they embody a lever 28, pivoted at 29, and having a lateral finger piece 30 projecting to the exterior of the casing by which it may be moved in one direction. The lever also has a lateral projection 31 within the casing, adjacent the opening 32, through which a shutter releasing cable or other device may operate on the projection 31. A lateral projection 33 on the lever 28 bears on one arm of a bell crank lever 34, which is pivoted at 35, and is moved in one direction by a spring 36 which surrounds the pivot 35 and has an arm engaging a lateral projection 37. The bell crank lever is also provided with a beveled projection 38 for coöperation with the end 39, of the master lever 20, said end 39 being laterally flexible in order that, after the master lever has been moved by the operating lever 34 and then released, said operating lever may return to normal position without moving the master member on the pivot of the latter. Specifically, the movement of the lever 28, inwardly, turns the lever 34 on its pivot 35 causing the projection 38 to engage the end 39 of the master lever and shift the master lever until such a time that the master lever slips off the projection 38 due to the fact that the levers 34 and 20 turn on different pivots. This slip-off releases the master lever permitting the return of the latter, unless stopped by other means, after which the operating member 34 returns to normal position, slipping by the master lever which flexes laterally at such time under the action of the beveled projection 38. An inwardly-turned projection 40, on the arm of the master lever, limits the inward movement of this end of the master lever in order to maintain coöperative relation between such end and the operating member 34.

For acting on the master membed in order to detain the latter for the purpose of obtaining "bulb" and "time" exposures, there is provided a detaining member 41, preferably pivoted at 42 and having a single stop shoulder 43, arranged to move into the path of a projection 44 on the master member 20 to hold the master member in the position shown in Fig. 8, so that the shutter blades are held in open position. A spring 45 acts on this detaining member to throw the stop 43 into the path of the projecting abutment 44 and the operating lever 34 coöperates with the detaining member to hold the stop shoulder 43 out of the path of the projection 44 when the shutter is in normal position. This coöperation between the operating lever 34 and the detaining member 41 is preferably effected by a lateral projection 46, on the operating lever 34, engaging the end of a lateral arm 47, on the detaining member 41, so that when the operating member 34 is moved, it swings the projection 46 out of engagement with the extreme end 48 of the arm 47, permitting the detent or detaining member to carry the stop 43 into the path of the projecting abutment 44. In moving away from the extreme end 48, the projection 46 travels in engagement with the beveled portion 49 on the arm 47 of the detaining member and, in this way, causes the detaining member to move gradually under the action of the spring 45 until the end of the beveled portion 49 is reached, when the projection 46 engages with a shoulder 50 and holds the operating member 34 against return movement under the action of a spring 36. In this position, the detent 43 lies in the path of the projections 44 as will be seen by referring to Fig. 8.

In order that the detaining member may be shifted out of the path of said master member, the detaining member is provided with a movable member 51 which is pivoted to the detaining member at 52 and has an abutment 53 thereon lying in the path of the shoulder 46, so that, after the parts are in the positions shown in Fig. 8, a movement of the projection 46, into engagement with the abutment 53, causes the detaining member to be moved on its pivot 42, thus moving the stop 43 from the path of the projection 44 so that the master member may return to normal position. This movement of the detaining member moves the shoulder 50 out of the path of the projection 46, permitting the operating member 34 to return to normal position. To the end that the movable member 51 will not be engaged by the projection 46 when it is moved in the first instance, during the movement of the master member to store energy in the spring 26, the master member engages with an inwardly-turned projection 54 on the movable member 51, lifting the abutment 53 out of the path of the projection 46. The abutment 53 returns into the path of the projections 49, upon the return of the master lever to its intermediate position, shown in Fig. 8.

For retarding the closing movement of the blades, there may be employed a retarding means comprising preferably a curved lever 55 pivoted at 56 within the annular chamber and having a weighted end 57. A spring 58 acts on this lever to move it in one direction while a projection 59, on the master lever, coöperates with one side of the retarding lever 55 so that said lever may be moved to tension a spring 58 by the master lever, the spring of the master lever being stronger than that of the retarding lever.

There is also employed a controlling member, common to the detaining member and the retarding means, for the purpose of producing time exposure, bulb exposure and graded instantaneous exposures. This controlling member is preferably in the form of a swinging lever or frame 60 pivoted at 61 within the casing at one side of the lens tube 3 and having an opening through which said lens tube extends. Projecting from this lever is an indicating pointer 62 which operates through a slot in the casing cover 4 and is bent to overlie a plate 63 which is secured to the front face of the cover 4, over such slot. This lever 60 has an inwardly turned lug 64 thereon, which coöperates with a lug 65 on the retarding lever 55, the coöperation being such that, when the lever 60 is in one extreme position, it permits the full movement of the retarding lever under the action of the spring 58, while, in the other extreme position, it holds the retarding lever entirely against movement so that the retarding lever is not imposed upon the master lever. Owing to the formation of the coöperating lugs 64 and 65, the controlling lever 60 can be used for moving the retarding lever 55 out of contact with the projection 59 while the master lever is in normal position to obtain time exposure.

To the end that the detaining member 44 shall have its stop 43 held from the path of the master member when the retarding lever is adjusted to produce so called instantaneous exposures of graded duration, the controlling lever is provided with a surface 66 which coöperates with a shoulder 67 on the detaining member 41 and prevents any movement whatsoever, of said detaining member, so that the detaining member is held out of action during said so-called instantaneous exposures, while the retarding lever is permitted to act, during such time, an amount corresponding to the adjustment.

For bulb exposures, the controlling lever 60, is provided with a surface 68 which, when adjusted to a position opposite to the projection or shoulder 67, permits a slight movement of the detaining member so that the stop 43 may move a short distance into the path, but not far enough to carry the projection 46 out of engagement with the inclined surface 49, so that, when the operating devices are released, the projection 46 will bear against the inclined surface 49 and move the detaining member to carry the stop 43 out of the path of the projection 44, on the master member, in order to permit the master member to move to normal position to close the shutter blades.

For time exposures, the controlling lever 60 is notched at 69 to permit the detaining member to make a complete movement upon the movement of the master member, and, at the same time, the retarding lever is held against any movement. The shifting of the lever 34, to move the master member 20 in order to tension the spring 26, will, under this adjustment of the controlling member 60, cause the projection 46 to interlock with the shoulder 50 of the detaining member so that, when the finger piece 30 is again pressed, the projection 46 will engage the abutment 53 and shift the stop 42 from the path of the shoulder 44 on the master lever, permitting the latter to effect the closing of the shutter blades.

A photographic shutter constructed in accordance with this invention has the blade operating ring held to the casing partition by a plate on which the ring is journaled, said plate facilitating the assembling of the shutter by not only holding the ring in place but also forming a flat surface on which the blades may operate. The retarding means is in the form of a simple lever arranged within the annular chamber about the shutter aperture. The detaining means and the retarding means are controlled by a common member, in the form of a lever, arranged within the annular chamber and having an opening through which the lens tube projects, the pivotal lever being on that side of the lens tube opposite that on which the detaining means is arranged.

What we claim as our invention and desire to secure by Letters Patent is:—

1. In a photographic shutter, a casing having a partition provided with an aperture and an annular depressed portion about the aperture, a ring fitting in said depressed portion, blades operated by the ring, and a plate secured over the ring to hold it to the partition.

2. In a photographic shutter, a casing having a partition provided with an aperture, a plate secured to said partition and provided with openings, a ring secured between the partition and the plate and having pins projecting therefrom through the openings, and blades pivotally mounted on said pins and operating in contact with said plate.

3. In a photographic shutter, a casing having a partition provided with an aperture, a plate secured to said partition and provided with a bearing, a ring turning on said bearing between the plate and the partition, and blades operated by said ring.

4. In a photographic shutter, a casing having a partition provided with an aperture and a depressed portion about the aperture, a ring secured in said depressed portion, a plate secured to said partition and having a bearing portion on which the ring turns and also provided with openings, pivot pins carried by the ring and projecting through the openings and blades connected to said pins.

5. In a photographic shutter, a casing ring, a partition within said ring forming chambers on opposite sides thereof and provided with an aperture and a depressed portion surrounding the aperture, a ring arranged in said depressed portion, pivot pins carried by said ring, a plate secured to said partition and having openings through which the pins project, said plate having a bearing portion thereon projecting into the ring to provide a journal for the latter, and blades connected to said pins.

6. In combination in a photographic shutter having a shutter operating mechanism provided with a pivoted master lever, a weighted retarding lever curved partially about the shutter aperture and pivoted at one end in proximity to the pivot of the master member, portions being provided on the two levers adjacent their pivots by which the retarding lever is moved through the master member, a spring acting in opposition to the master member, and means for controlling the position of the retarding lever.

7. In combination in a photographic shutter having detaining means for holding the shutter blades open, said means being mounted on one side of the exposure aperture, a controlling lever for the detaining means pivoted on the opposite side of the aperture and extending to the detaining means about the aperture.

8. In combination in a photographic shutter, having detaining means for holding the shutter blades open, a controlling lever for the detaining means pivoted at one side of the aperture and having an opening through which the lens tube of the shutter extends.

9. In combination in a photographic shutter having detaining means for holding the shutter open, a controlling lever for the detaining means pivoted at one side of the aperture of the shutter and having an opening through which the lens tube of the shutter projects, the wall of said opening being formed with surfaces for coöperating with the detaining means to effect time, bulb and instantaneous exposures.

10. In combination in a photographic shutter having detaining means for holding the shutter open and retarding means for effecting graded exposures, a controlling member common to the detaining means and the retarding means pivotally mounted to one side of the lens tube of the shutter and having an opening through which the lens tube projects.

11. In combination in a photographic shutter having retarding means for delaying the action of the shutter blades, a controller for said retarding means pivotally mounted to one side of the lens tube and having an opening through which the lens tube projects.

12. In combination in a photographic shutter, a weighted retarding lever, a spring for moving said lever in one direction, and a pivoted controlling lever engaging said retarding lever and carrying an index or pointer.

13. In combination in a photographic shutter having a lens tube, an annular chamber about the lens tube, and shutter operating mechanisms arranged therein, a curved retarder lever mounted within the annular chamber, weighted at one end and pivoted at the other end, a spring for moving said weighted retarder lever in one direction, and a controlling lever arranged in the annular chamber, coöperating with the retarding lever and pivoted to one side of the lens tube, said lever having an opening through which the lens tube projects.

14. In combination in a photographic shutter having a lens tube, a shutter operating mechanism arranged about the lens tube, detaining means for the shutter operating mechanism and retarding means for delaying the closing of the shutter, a controlling lever common to the detaining means and the retarding means, pivoted to one side of the lens tube and having a central opening through which the lens tube projects.

RUDOLPH KLEIN.
THEODOR BRUECK.